June 2, 1953    R. V. STALZER    2,640,893
SWITCH ACTUATING DEVICE FOR HAY BALERS
Filed Nov. 21, 1950
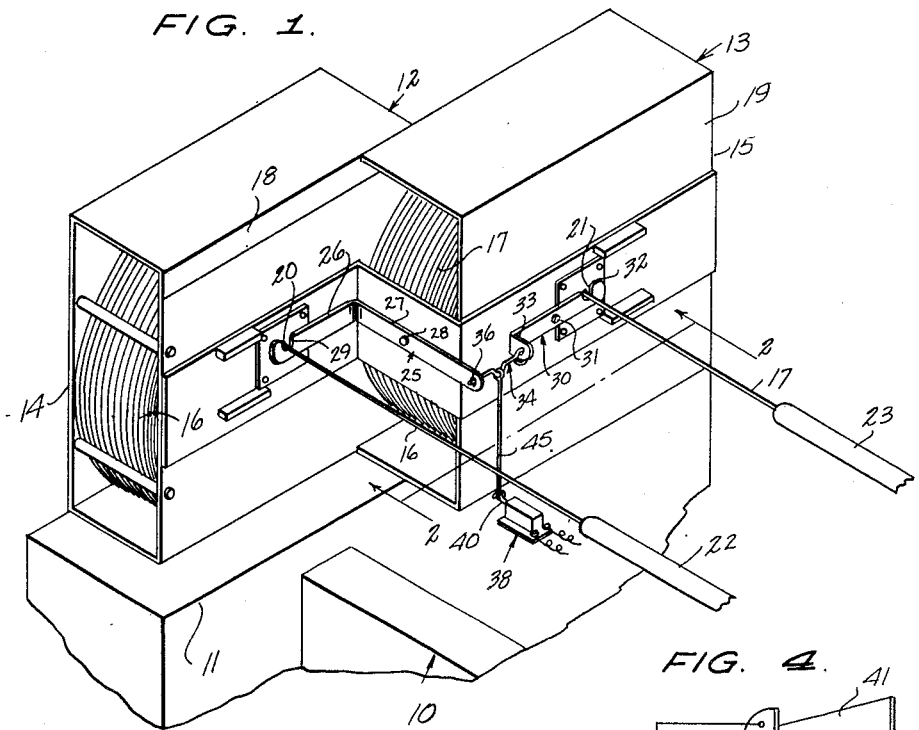
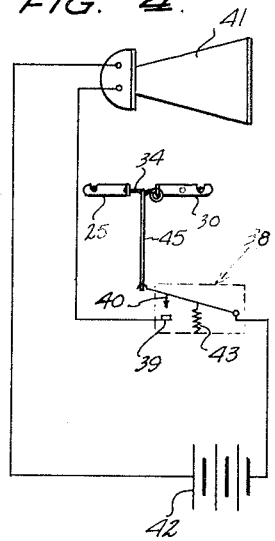
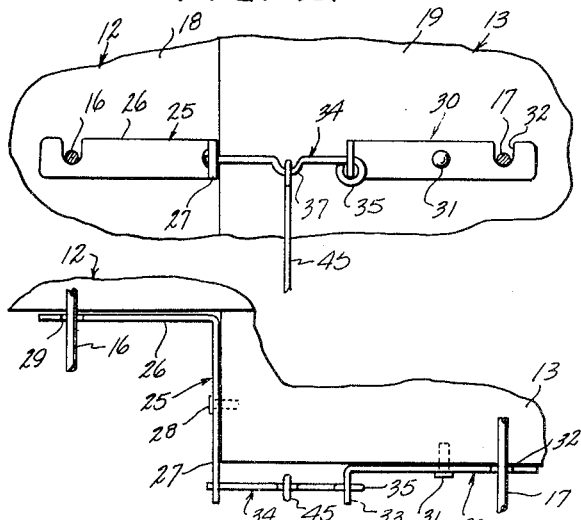
INVENTOR
RALPH V. STALZER,
BY
McMorrow Berman & Davidson
ATTORNEYS.

Patented June 2, 1953

2,640,893

UNITED STATES PATENT OFFICE 2,640,893

SWITCH ACTUATING DEVICE FOR HAY BALERS

Ralph V. Stalzer, Renwick, Iowa

Application November 21, 1950, Serial No. 196,849

8 Claims. (Cl. 200—52)

1

This invention relates to an audio signaling device for an automatic pick-up hay baler.

An object of this invention is to provide an audio signaling device for an automatic pick-up hay baler which sounds an alarm when the baler runs out of baling wire or when the baling wire breaks.

Another object of this invention is to provide an audio signaling device for an automatic hay baler including baling wire housings not visible from the driver's seat, which is particularly adapted to sound an alarm when the supply of baling wire is about to run out, thereby warning the driver to stop the baler and replenish the supply of baling wire.

A further object of this invention is to provide an audio signaling device for an automatic pick-up hay baler including baling wire housings not visible from the driver's seat, which is particularly adapted to sound an alarm when the supply of baling wire is about to run out, thereby warning the driver to stop the baler before imperfect bales are being formed by the baler or the wire-receiving needles thereof are unthreaded.

A still further object of this invention is to provide an audio signaling device for an automatic pick-up hay baler which is relatively simple in structure, easy to attach to any baler, and cheap to manufacture.

The above and still further objects and advantages of the present invention will become apparent upon consideration of the following detailed description of the invention, when taken in conjunction with the accompanying drawings, wherein:

Figure 1 is a perspective view of the audio signaling device of the present invention shown operatively connected to an automatic pick-up hay baler having baling wire housings and baling wire-receiving needles;

Figure 2 is an enlarged fragmentary elevational view taken along the line 2—2 of Figure 1;

Figure 3 is an enlarged fragmentary top plan view of a part of the signaling device shown in Figure 1; and Figure 4 is a schematic wiring diagram of the electrical circuit for the audio signaling device of the present invention.

Referring now more particularly to the drawings, wherein like reference numerals have been used throughout the several views to designate like parts, there is shown a conventional hay baler 10 including a mobile frame or base 11 supporting a pair of baling wire housings 12 and 13 which are disposed in side-by-side staggered

2 relation with respect to each other. The housings 12 and 13 have the side walls 18 and 19 provided with the apertures 20 and 21 for the extension therethrough of the wire contained in the adjacent one of the housings. Supported in spaced, confronting relation with respect to the apertures 20 and 21 are the baling wire-receiving needles 22 and 23 through which the baling wires are threaded.

The audio signaling device of the present invention embodies a first wire-engaging element 25 which is positioned contiguous to the housing 12 and is mounted on the adjacent end of the housing 13 for swinging movement about an axis extending longitudinally of the latter. The wire-engaging element 25 includes the end portions 26 and 27 which are arranged at right angles with respect to each other, the end portion 27 carrying the pivot pin 28. The end portion 26 is disposed transversely of the baling wire extending through the aperture 20 and is provided with a notch 29 in the path of the wire, the bounding walls of the notch 29 being engageable with the wire and limiting the swinging movement of the wire-engaging element 25 in the clockwise direction about the axis 28.

Positioned contiguous to the side 19 of the baling wire housing 13 is a second wire-engaging element 30 which is mounted intermediate its ends by means of the pivot 31 for swinging movement about an axis extending transversely of the housing 13. The wire-engaging element 31 is provided with a notch 32 contiguous to and spaced inwardly from one end thereof, the notch being disposed in the path of the baling wire extending through the aperture 21. The bounding walls of the notch 32 engage the adjacent baling wire and limit the rocking movement of the wire-engaging element 30 about the pivot 31 in a counterclockwise direction. The wire-engaging element 30 has its end remote from the notch 32 bent into spaced, parallel relation with respect to the end portion 27 of the first wire-engaging element 25, the bent end being designated by the reference numeral 33.

Extending between the bent end 33 of the wire-engaging element 30 and the end portion 27 of the wire-engaging element 25 is a link 34 which has one end formed with an eye 35 receivable within an aperture provided in the bent end 33 of the wire-engaging element 30. The other end of the link 34 is receivable within an aperture 36 provided in the end portion 27 of the wire-engaging element 25. Accordingly, the link 34 detachably secures the wire-engaging elements 25 and 30 together. Intermediate its ends the link 34 is provided with a crank 37 for a purpose to be subsequently described.

Supported on the mobile frame or base 11 is a switch 38. As clearly shown in Figure 4, the switch 38 includes a fixed contact 39 and a movable contact 40 which is mounted for movement into and out of engagement with the fixed contact 39. The switch 38 is connected in a series circuit between a suitable audio alarm, such as the horn 41, and a suitable source of electrical energy, such as the battery 42. Operatively connected to the movable contact 40 is a spring 43 which normally urges the movable contact 40 into engagement with the fixed contact 39 to close the series circuit between the battery 42 and the horn 41 to thereby actuate the latter. Operatively connected to the crank portion 37 of the link 34 and the movable contact 40 is a connecting arm 45 which maintains the movable contact 40 out of engagement with the fixed contact 39 when the wire-engaging elements 25 and 30 are limited in their rocking movement by the adjacent wires. In the event that either of the wire-engaging elements 25 and 30 is permitted to swing freely due to a break in either of the wires, the movable contact 40 will be urged into engagement with the fixed contact 39 by the spring 43 to thereby complete the series circuit for the horn 41 and the battery 42 to thereby sound an alarm.

In actual use, the audio signaling device is operatively connected to the automatic pick-up hay baler, as shown in Figure 1. When either of the baling wires breaks or runs out, the adjacent wire-engaging element will be free to rock in a direction permitting the movable contact 40 to move into engagement with the fixed contact 39 with the restoring force of the spring 43. It is to be noted that the link 34 provides a positive connection between the wire-engaging elements 25 and 30, yet permits the elements to move independently of each other. Once the signaling device has been tripped, due to the wire running out or breaking, the device can be reset by reinserting the free end of the link 34 in the apertures 36 provided in the adjacent end of the wire-engaging element 25.

Although only one embodiment of the audio signaling device for the hay baler of the present invention has been described, it is readily apparent that numerous modifications can be made without departing from the spirit of the invention as set forth in the appended claims.

What I claim is:

1. In an alarm switch means for a hay baler, the combination with a pair of wire housings each including means for the extension therethrough of the wire contained therein, of a first wire-engaging element positioned contiguous to one of said housings and mounted for rocking movement about a first axis, means formed on said first wire-engaging element in the path of the adjacent wire and engageable therewith for limiting said rocking movement in one direction, a second wire-engaging element positioned contiguous to the other of said housings and mounted for rocking movement about a second axis, means formed on said second wire-engaging element in the path of the adjacent wire and engageable therewith for limiting the rocking movement of said second wire-engaging element in one direction, and a link carried by said second wire-engaging element and engaging said first wire-engaging element for detachably connecting said elements together.

2. In an alarm switch means for a hay baler, the combination with a pair of wire housings each including means for the extension therethrough of the wire contained therein, of a first wire-engaging element positioned contiguous to one of said housings and mounted for rocking movement about a first axis, means formed on said first wire-engaging element in the path of the adjacent wire and engageable therewith for limiting said rocking movement in one direction, a second wire-engaging element positioned contiguous to the other of said housings and mounted for rocking movement about a second axis, means formed on said second wire-engaging element in the path of the adjacent wire and engageable therewith for limiting the rocking movement of said second wire-engaging element in one direction, a link carried by said second wire-engaging element and engaging said first wire-engaging element for detachably connecting said elements together, and a connecting arm attached to said link for movement therewith responsive to rocking movement of either element in said direction.

3. In an alarm switch means for a hay baler, the combination with a pair of wire housings each including means for the extension therethrough of the wire contained therein, of a first wire-engaging element positioned contiguous to one of said housings and mounted for rocking movement about a first axis, means formed on said first wire-engaging element in the path of the adjacent wire and engageable therewith for limiting said rocking movement in one direction, a second wire-engaging element positioned contiguous to the other of said housings and mounted for rocking movement about a second axis, means formed on said second wire-engaging element in the path of the adjacent wire and engageable therewith for limiting the rocking movement of said second wire-engaging element in one direction, a link connected at opposite ends thereof to the respective elements, and a connecting arm having one end connected to the link intermediate the opposite ends of the link, for movement with the link responsive to rocking of either element in said direction.

4. In an alarm switch means for a hay baler, the combination with a pair of baling wire housings disposed in side-by-side staggered relation with respect to each other, each housing having one side provided with means for the extension therethrough of the wire contained therein, of a first wire-engaging element positioned contiguous to said one side of one of said housings and mounted on the adjacent end of the other of the housings for swinging movement about an axis extending longitudinally of the latter, said first element having one end arranged in spaced parallel relation with respect to said one side of said one housing and provided with means in the path of the adjacent wire and engageable therewith for limiting said swinging movement in one direction, a second wire-engaging element positioned contiguous to said one side of the other of said housings and mounted on the latter for swinging movement about an axis extending transversely of said other housing, said second wire-engaging element being provided with means in the path of the adjacent baling wire for limiting the rocking movement of said second wire-engaging element in one direction, a link having one end pivotally supported on said second wire-engaging element and having the other end receivable within an aperture provided in the other end of said first wire-engaging element for detachably securing said elements together, and a connecting arm attached to the link for movement therewith responsive to rocking of either element in said direction.

5. In an alarm switch means for a hay baler, the combination with a pair of wire housings each including means for the extension therethrough of the wire contained therein, of a first wire-engaging element positioned contiguous to one of said housings and mounted for rocking movement about a first axis, said first wire-engaging element being disposed adjacent said means of said one housing for engagement by the wire extended therethrough for limiting said rocking movement in one direction, a second wire-engaging element positioned contiguous to the other of said housings and mounted for rocking movement about a second axis, the second wire-engaging element being disposed adjacent said means of the other housing for engagement by the wire extending therethrough for limiting the rocking movement of said second wire-engaging element in one direction, and a link carried by said second wire-engaging element and engaging the first wire-engaging element for detachably connecting the elements together.

6. In an alarm switch means for a hay baler, the combination with a pair of wire housings each including means for the extension therethrough of the wire contained therein, of a first wire-engaging element positioned contiguous to one of said housings and mounted for rocking movement about a first axis, the first wire-engaging element being disposed adjacent said means of said one housing for engagement by the wire extending therethrough to limit rocking movement of the first wire-engaging element in one direction, a second wire-engaging element positioned contiguous to the other housing and mounted for rocking movement about a second axis, the second element being disposed adjacent said means of the other housing for engagement by the wire extending therethrough to limit rocking movement of the second element in said one direction, a link carried by the second wire-engaging element and engaging the first element for detachably connecting the elements together, and a connecting arm attached to the link for movement therewith responsive to rocking movement of either element in said direction.

7. In an alarm switch means for a hay baler, the combination with a pair of wire housings each including means for the extension therethrough of the wire contained therein, of a first wire-engaging element positioned contiguous to one of said housings and mounted for rocking movement about a first axis, the first element being disposed adjacent said means of said one housing for engagement by the wire extending therethrough to limit rocking movement of the first element in one direction, a second wire-engaging element positioned contiguous to the other housing and mounted for rocking movement about a second axis, the second element being disposed adjacent said means of the other housing for engagement by the wire extending therethrough to limit rocking movement of the second element in one direction, a link connected at opposite ends thereof to the respective elements, and a connecting arm having one end connected to the link intermediate the opposite ends of the link for movement with the link response to rocking of either element in said direction.

8. In an alarm switch means for a hay baler, the combination with a pair of baling wire housings disposed in side-by-side staggered relation with respect to each other, each housing having one side provided with means for the extension therethrough of the wire contained therein, of a first wire-engaging element positioned contiguous to said one side of one of said housings and mounted on the adjacent end of the other housing for swinging movement about an axis extending longitudinally of the latter, the first element having one end arranged in spaced parallel relation with respect to said one side of said one housing and being disposed adjacent the wire of said one housing for engagement thereby to limit said swinging movement in one direction, a second wire-engaging element positioned contiguous to said one side of the other housing and mounted on the latter for swinging movement about an axis extending transversely of said other housing, the second element being disposed adjacent the wire of said other housing for engagement thereby to limit swinging movement of the second element in one direction, a link having one end pivotally supported on the second wire-engaging element and having its other end receivable within an aperture provided in the other end of the first wire-engaging element for detachably securing the elements together, and a connecting arm attached to the link for movement therewith responsive to rocking of either element in said direction.

RALPH V. STALZER.

References Cited in the file of this patent
UNITED STATES PATENTS

| Number | Name | Date |
| --- | --- | --- |
| 1,004,911 | Rouse | Oct. 3, 1911 |
| 1,305,836 | Schoening | June 3, 1919 |
| 2,509,017 | Sear | May 23, 1950 |